United States Patent [19]

Pradt

[11] 4,013,560
[45] Mar. 22, 1977

[54] ENERGY PRODUCTION OF WET OXIDATION SYSTEMS

[75] Inventor: Louis A. Pradt, Wausau, Wis.

[73] Assignee: Sterling Drug Inc., New York, N.Y.

[22] Filed: Apr. 21, 1975

[21] Appl. No.: 569,942

[52] U.S. Cl. .................. 210/152; 60/39.05; 162/31; 210/63 R; 210/198 R

[51] Int. Cl.² .................................. C02C 5/04

[58] Field of Search ............. 60/39.05, 39.12; 210/10, 63, 71, 152, 177, 180, 181, 198 R, 199, 259; 162/31

[56] References Cited

UNITED STATES PATENTS

| | | | |
|---|---|---|---|
| 2,773,026 | 12/1956 | Cederquist | 210/259 X |
| 2,824,058 | 2/1958 | Zimmerman | 210/63 |
| 2,932,613 | 4/1960 | Huessler et al. | 210/63 |
| 3,002,347 | 10/1961 | Sprague | 60/39.12 |
| 3,661,778 | 5/1972 | Pradt | 210/71 X |
| 3,920,506 | 11/1975 | Morgan | 210/63 R |

Primary Examiner—Frank A. Spear, Jr.
Assistant Examiner—R. G. Mukai
Attorney, Agent, or Firm—Charles R. Fay

[57] ABSTRACT

A wet oxidation system comprising a reactor, means supplying liquor and air through preheaters to the reactor, means for cooling the oxidized products from the reactor to substantially less than 200° F, or close to the temperature of the incoming air and liquor, and means for separating the liquid and gas phases at the lower temperature; means for injecting a controlled amount of water into the relatively dry and cool gas stream from the separation means, and means for heating the gas stream with the products from the reactor to substantially completely vaporize the water injected, or completely vaporize and superheat the water injected, and means for delivering the gas stream so generated to a device for recovering mechanical power.

9 Claims, 6 Drawing Figures

ENERGY PRODUCTION OF WET OXIDATION SYSTEMS

BACKGROUND OF THE INVENTION

Wet oxidation or wet air oxidation is well known and is in commercial use. See for example, U.S. Pat. No. 2,665,249, Zimmerman. Also, the recovery of energy or power in a wet oxidation system is known and has been practiced. See the paper by Morgan and Saul, APPITA, Volume 22, Number 3, "The Zimmermann Process in a Soda Pulp Mill Recovery System". Other references are U.S. Pat. No. 2,944,396, Barton; a paper by Guccione, Chemical Engineering, May 25, 1964, "Wet Combustion of Sewage Sludge Solids Disposal Problems"; and a paper by G. H. Teletzke, Chemical Engineering Progress, Jan. 1964, "Wet Air Oxidation".

The flow sheet of FIG. 1 shows a commercial system that is applicable to relatively concentrated liquors or "strong liquors". These liquors are characterized by a high chemical oxygen demand (COD) with a value of 100 g/l or greater. Examples of such liquors are pulping black liquors and concentrated industrial wastes. COD reduction is generally 90% or more. Distinctive features of the strong liquor flow sheet (FIG. 1) are: The liquid and gas phases are separated immediately after the reactor, e.g., in a separator built into the top of the reactor, and a substantial portion of the water in the feed liquor is evaporated and leaves the reactor in the gas phase. The gases from the reactor are first directed to a steam generator to make pure steam thereby cooling the gases causing a substantial portion of the water vapor to condense, the condensate being then removed as liquid water from a separator. The gas phase is directed to an expander/generator or other device for mechanical power recovery.

A disadvantage of this system is that the expander/generator does not make use of the maximum system temperature. If the gas stream is directed to the expander/generator directly from the reactor then the expander exhaust temperature is too low to enable pure steam to be generated. However, in most commercial applications there is a definite economic advantage in generating pure steam as shown in FIG. 1. A further disadvantage to this system is that when the gas stream from the reactor is cooled to low temperatures in order to make the maximum amount of steam, then expansion of this low temperature gas stream through the expander results in an exhaust temperature well below the freezing point of water which creates serious problems in the expander. It would therefore be necessary to reheat this gas using an outside source of heat.

FIG. 2 is a flow sheet applicable commercially to relatively dilute liquors and sludges or "weaker liquors". The COD of such liquors is less than 100 g/l. An example of such a liquor is sewage sludge which typically has a COD in the range of 40–60 g/l. The degree of COD reduction is typically in the range of 50–85%. There is generally not enough heat in the oxidized liquor alone to accomplish all the necessary preheating in equipment of practical size. Therefore it is necessary to extract heat from the gas phase as well as the liquid phase as in FIG. 2. The entire reactor outlet stream is cooled so that the final temperature of the gas, while still hot, is less than the maximum reactor temperature.

It can be seen that the same preheating effect can be accomplished if the phases are separated immediately after the reactor as shown in FIG. 3. In the flow system of FIG. 3, the gas phase only is passed through the second preheater and thence to a second separator. It can be seen that this system is more complicated requiring two separators and generating two liquid streams, the oxidized liquor and the condensate from the second separator.

In practice, and especially when treating sewage sludge, the gas from the separator from either flow sheet FIG. 2 or FIG. 3 still contains hydrocarbons in sufficient quantities so that further treatment is necessary before the gas can be passed through the expander/generator or discharged to the atmosphere. A catalytic gas-phase oxidizing unit has been used for this purpose.

A typical flow sheet for such a unit is shown in FIG. 4. Gas from the separator goes through a preheater and thence through a fuel fired startup heater, used only to start the device, and then through a catalyst bed where gas phase oxidation of hydrocarbons takes place. The stream exiting from the catalyst is at a higher temperature due to the oxidation and thus can be used to preheat the inlet stream to the catalyst. The gas is then passed to the expander/generator. This system is advantageous under certain circumstances since, for example, it results in discharge of a gas to the expander/generator that is superheated and at a higher temperature than if no gas phase oxidation takes place, and this higher temperature is advantageous to the performance of the expander as is well known. However, with certain feed liquors, especially sewage sludge, many operating problems have arisen. The catalyst is subject to poisoning and fouling and becomes ineffective. The system is complex and expensive since the vessels and piping must be designed for high temperatures. With sewage sludge or other nitrogen containing liquors, nitrogen compounds such as ammonia are present in the gas and these tend to oxidize to nitric acid which creates further problems. Also with certain liquors containing highly volatile substances, volatile hydrocarbons are found in the gases and these have occasionally oxidized in a spontaneous and uncontrolled way in various parts of the system causing failures and creating safety hazards. This problem has been severe enough so that "hot separation" of the gas and liquid phases when treating these liquors probably should be avoided.

A further problem with the FIG. 2 flow sheet is that temperature control is difficult. Temperature control is done by regulating the amount of heat transferred in the preheater according to the system described generally in U.S. Pat. No. 2,903,425, Zimmermann. However, in practice the valves required for this control operation are subject to plugging and erosion and control is difficult and often unsatisfactory.

PREFERRED EMBODIMENT OF THE INVENTION

Figure 5:
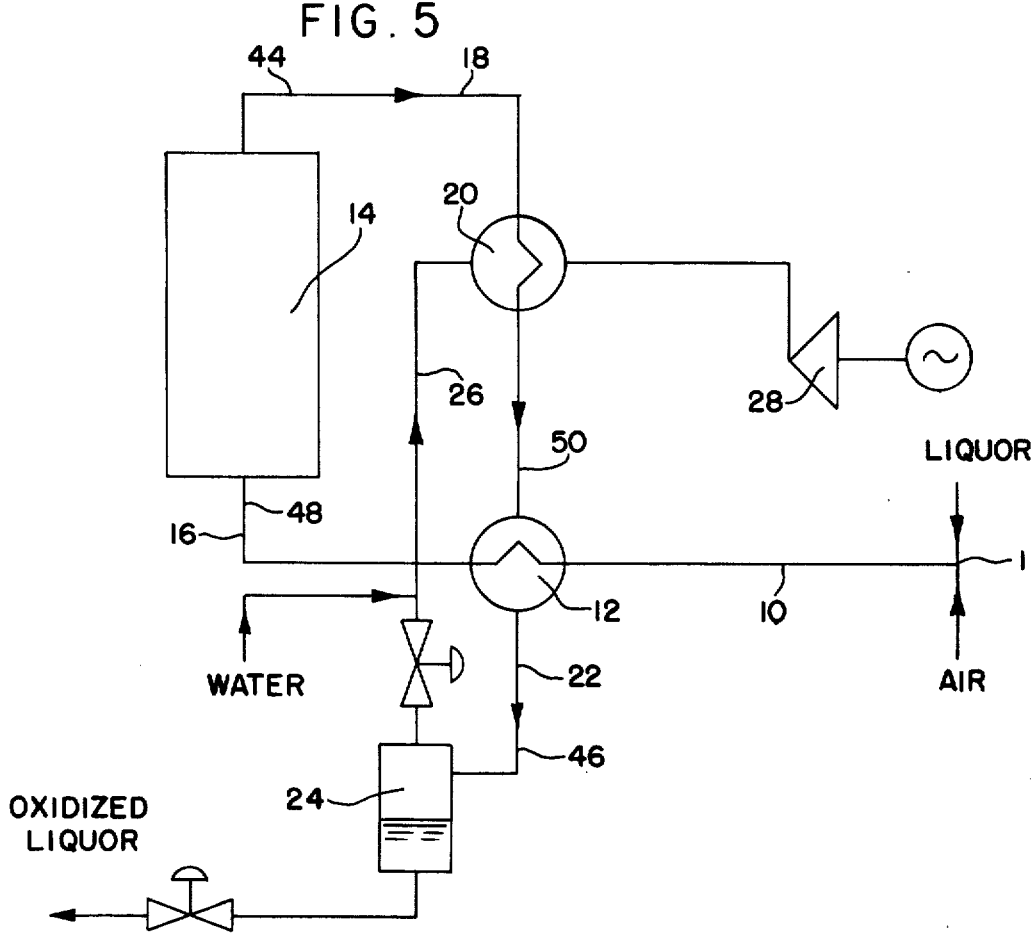
FIGS. 5 and 6 are flow diagrams illustrating the present invention.

Referring now to FIG. 5, the incoming liquor and air passes through a conduit 10 and through a preheater 12 into the reactor 14 through conduit 16. The outlet stream is shown at 18 and this passes through a heat exchanger (reheater 20) to the preheater 12, thence through a conduit 22 to the separator 24, gas or steam passing through conduit 26 through the reheater 20 and thence to the expander generator 28 for the recovery of mechanical energy.

In this case, the term "air" is used throughout to indicate any oxygen containing gas, including pure oxygen.

By this system the reactor outlet stream is cooled as in the reheater (heat exchanger) and preheated to a low temperature generally less then 200° F and preferably less than 150° F, as by heat exchanging the reactor outlet stream against the incoming liquor and air and additionally by cooling the reactor outlet stream against the gas stream separated at low temperature from the liquid phase.

Liquor and air, or liquor separately, are heated and enter the reactor. The reactor products are first, heat exchanged against the gas stream, thereby reheating the gas using the maximum temperature of the system, and the reactor products are then directed to a second heat exchanger thereby heating the incoming liquor or mixture of liquor and air. The oxidized products from the reactor are cooled to as near the temperature of the incoming liquor or liquor and air as is possible and economically feasible. There will be an economic tradeoff between the cost of the heat exchanger and the value of heat recovered from the oxidized products.

An outstanding feature of this invention is that it allows the system to be controlled by the amount of heat removed from the oxidized products in the heat exchanger in which the gas stream is reheated. It can be seen that if more or less heat is removed from the oxidized products in the reheater then there will be less or more heat available in the preheater and thus the system temperatures can be controlled by controlling the amount of reheating. This is done not by controlling the oxidized products exiting from the reactor since flow control of this stream is difficult as previously explained, but by adjusting the moisture content, pressure of the gas stream being reheated, and by by-passing the gas stream around the reheater. Water can be injected into the cold gas from the separator and as the gas and water is heated the water will vaporize therefore providing a large heat sink in the form of the latent heat of evaporation of the water thus injected. Generally it will be sufficient to maintain the pressure of the gas being reheated at nearly the pressure of the reactor there being only the system pressure drop between reactor and expander. However, if it is necessary to remove larger quantities of heat, the pressure of the gas can be throttled to a pressure substantially less than the reactor pressure thus allowing larger quantities to be vaporized in the reheater. Those skilled in the art will see that when the pressure of the gas is reduced, more water can be vaporized at a lower temperature thus reducing the temperature of the reactor outlet stream and removing more heat therefrom. On the other hand, if it is necessary to provide more heat for the preheater then the amount of water can be reduced and the pressure of the gas stream increased. If still more heat must be supplied to the preheater then gas can be bypassed around the reheater. This will be an easy operation since the gas stream will be clean and at a relatively low temperature.

A further outstanding feature of this invention is that the gas and liquid phases are separated at a low temperature which may be called "cold separation". It has been discovered that, at an installation where two wet oxidation units are running side by side processing sewage sludge, the efficiency of separation in the unit running with a "hot separator" is much inferior to the efficiency of separation in the second unit wherein cold separation is practiced. This phenomenon has been demonstrated in other wet oxidation units. The reason for this is not clearly understood, but it remains an undeniable fact. Also organic material in the gas stream of the "hot separator" unit above fouls and plugs up down stream gas treating equipment. In general it can be said that the cold separation system is much easier to run and operate whereas the hot separation system is plagued with operating difficulties and safety hazards as described above. Therefore, the present system provides a wet oxidation unit in which efficient mechanical power recovery can be practiced while still operating with a cold separator.

Figure 1:
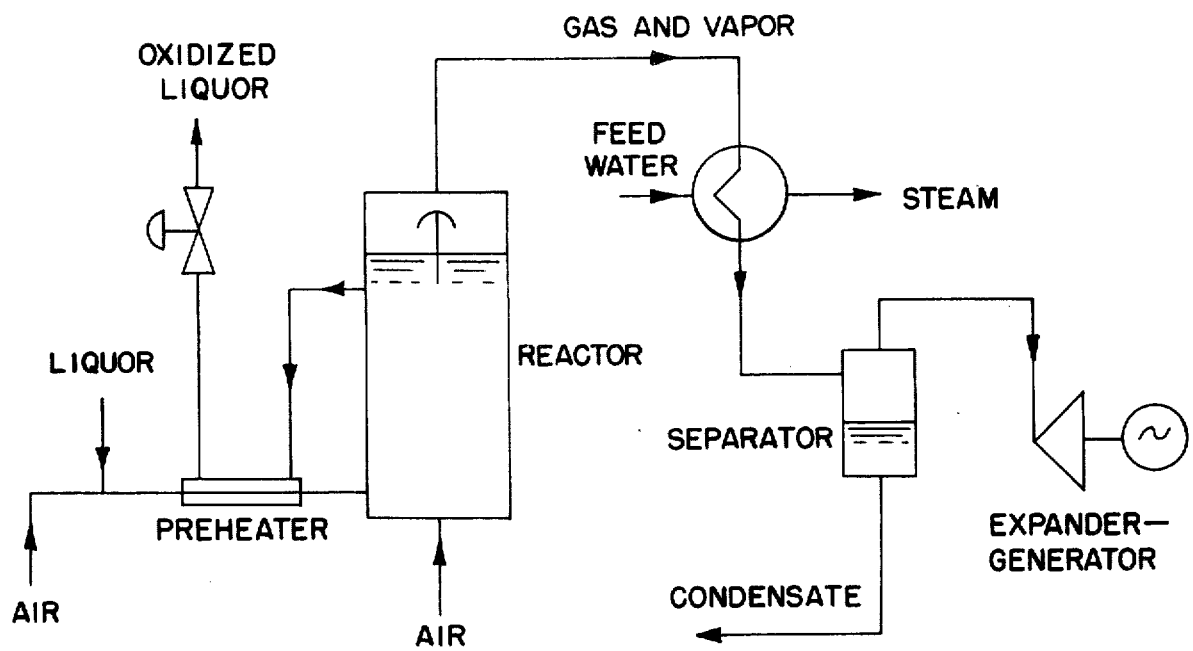
FIGS. 1–4 are flow diagrams illustrative of the prior art.
Figure 2:
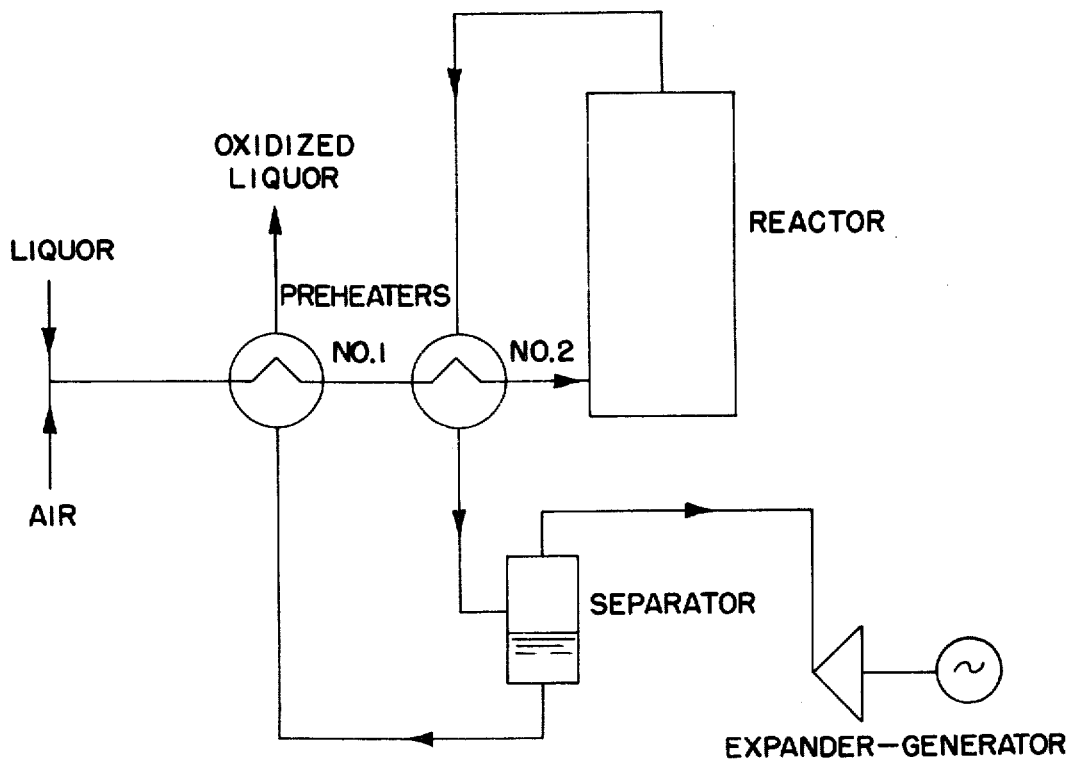
Figure 3:
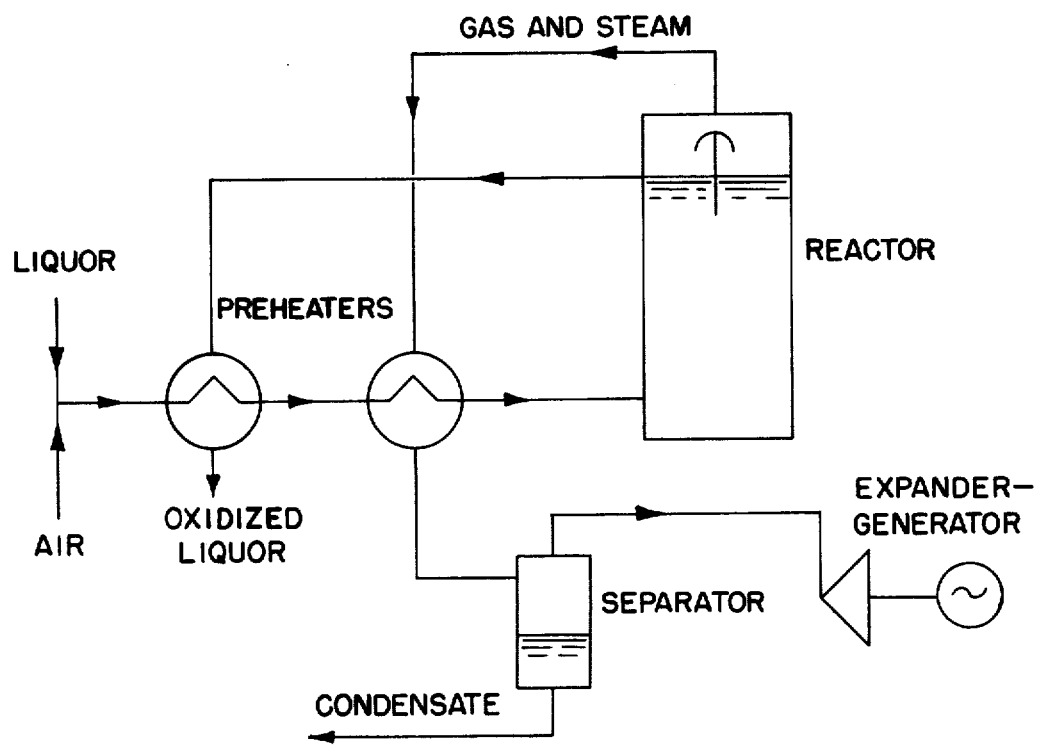
Figure 4:
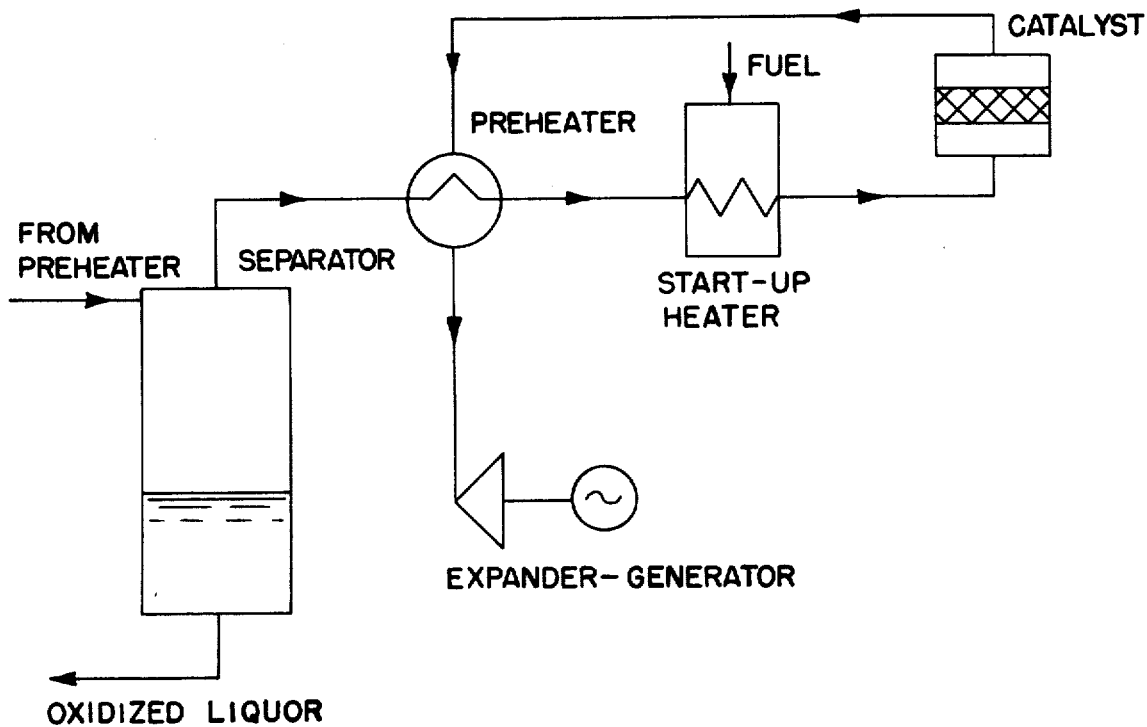
Figure 6:
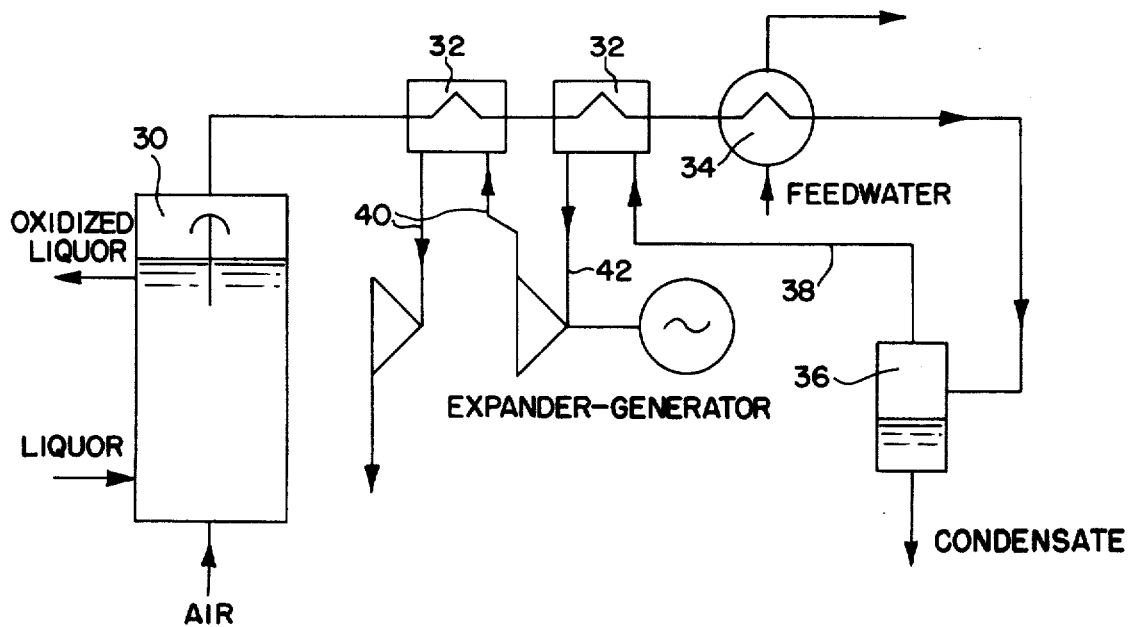

This invention will be most useful when applied to weaker liquors such as sewage sludge to which normally the flow sheet of FIG. 2 would be applied. However the invention can also be usefully applied to strong liquors thereby eliminating certain operating problems as previously enumerated. FIG. 6 is a flow sheet showing that the principles of this invention may be utilized to improve a wet oxidation system for strong liquors. Gas and liquid phases are separated after (or in the top of) the reactor 30. The gas phase goes first to reheaters 32 and then to a steam generator 34. Much of the water vapor in the gases is condensed and removed from the system as liquid condensate as by separator 36. The dry gas goes to the reheaters by conduit 38 for reheat prior to and between stages of expansion as at 40, 42. It is a feature of this application of this invention that the gas can be reheated many times. Two reheats are shown here but there could be five or more reheats. This is made possible by the fact that whereas sensible heat only is being added to the gas stream, latent heat of evaporation is being removed from the gas and water vapor stream exiting from the reactor. Therefore the temperature drop of the reactor outlet stream is much smaller than the temperature increase of the dryer gas from the separator. There are a number of configurations possible for the application of this invention but the principle is demonstrated in the flow sheets of FIGS. 5, and 6.

EXAMPLES

A sewage sludge with a COD of 50 g/l is subjected to wet oxidation wherein the COD reduction is 85%. The flow sheet is as shown in FIG. 5. The temperature of the air and liquor at point 1 is 85° F, the reactor outlet temperature, at point 44 is 520° F, and the separator temperature, point 46, is 120° F. The reactor pressure is about 1500 psig. The cool gas from the separator is throttled to a pressure of about 800 psig and about 0.84 lbs of water/lbs of air is injected into the gas after throttling. This mixture is then heated in the reheater so as to vaporize all of the water, exits from the reheater at a temperature of about 454° F and then passes to the expander/generator 28. If the expander/generator has an overall efficiency of 70%, then 93% of the pumping power for the sludge and air is recovered. The reactor inlet temperature point 48 is 411° F and the temperature of the oxidized sludge and gases exiting the reheater point 50 is 430° F.

EXAMPLE TWO

Pulping black liquor is oxidized in a wet oxidation system according to FIG. 6. The system pressure is 3000 psig. and the maximum reactor temperature is 600° F. The gas stream from the reactor is cooled to 400° F and the gas and liquid phases are separated. If the gas were expanded to atmospheric pressure at a temperature of 400° F the resulting exhaust temperature would be less than −50° F which would result in freezing of even minute quantities of water in the exhaust making the operation impractical. Therefore it is necessary to heat the gas. Reheating may be accomplished with a fired heater or by using steam but these methods require the use of outside energy sources. In this example assume that the expander is a five stage device and that the gas is heated to 500° F before the first three stages and to 400° F before the fourth stage with no reheating before the fifth stage. If the efficiency is 75% the final exhaust temperature will be 92° F which is nearly equal to the temperature of the air supplied to the unit. Thus the heat rejected in the exhaust of the expander is small and it can be seen that by adjusting reheat temperatures the expander exhaust temperature could be adjusted to a value less than the ambient air supplied to the wet oxidation unit. In the example above the total reheat is 170 BTU's/lb of gas. The gases from the reactor will be cooled to about 575° F in the reheaters, still retaining ample temperature for steam generation.

In the disclosure herein, the power recovery expander is shown driving an electric generator, but any other useful apparatus could be thus powered, e.g., compressors, pumps, etc.

I claim:

1. A wet oxidation apparatus comprising a reactor, a preheater therefor, and means to recover power, means supplying liquor and air through the preheater to the reactor, means cooling the oxidized products from the reactor to a point close to the temperature of the air and liquor supplied, means separating the liquid and gas phases at the lower temperature, means injecting a controlled amount of water into the relatively dry and cool gas stream from the separating means, means heating said gas stream with the products from the reactor to substantially completely vaporize the water injected, or completely vaporize and superheat the water injected, means delivering the gas stream so generated to the means for recovering power, the reactor stream cooling means comprising a heat exchanger heating the separated water injected gas phase, the preheater being heated by the reactant stream after leaving the cooling means.

2. The wet oxidation apparatus of claim 1 including means to reduce the relatively dry and cool gas in pressure.

3. The wet oxidation apparatus of claim 1 including means to control the temperature at which the apparatus operates.

4. The wet oxidation apparatus of claim 3 wherein the means to control the temperature of the apparatus includes means to adjust the quantities of the injected water.

5. The wet oxidation apparatus of claim 3 wherein the means to control the temperature of the apparatus includes means to control the pressure of the cool dry gas stream.

6. The wet oxidation apparatus of claim 3 wherein the means to control the temperature of the apparatus includes means by bypass the cooled dry stream around the means heating the gas stream.

7. The wet oxidation apparatus of claim 1 wherein the means to recover power comprises a multi-stage device.

8. The wet oxidation apparatus of claim 7 including means to reheat the gas between the stages of the multi-stage device.

9. The wet oxidation apparatus of claim 1 wherein the means heating the said gas stream with the products of the reactor completely vaporizes the water injected and superheats the gas.

* * * * *